R. G. LECKIE.
Improvement in Evaporators for Brine.
No. 123,182.
Patented Jan. 30, 1872.
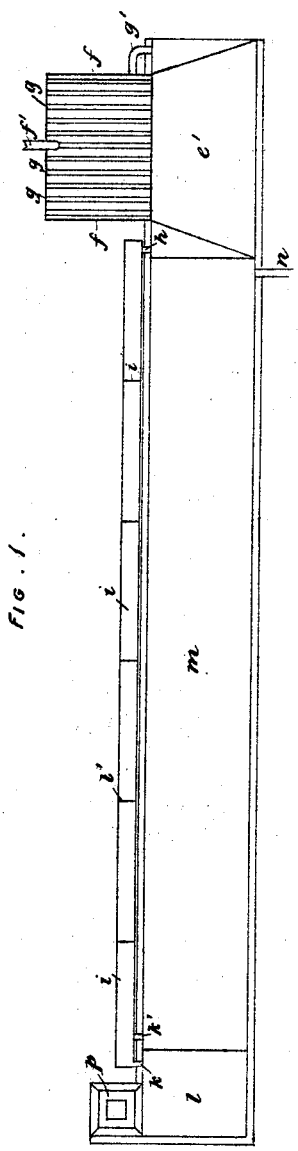
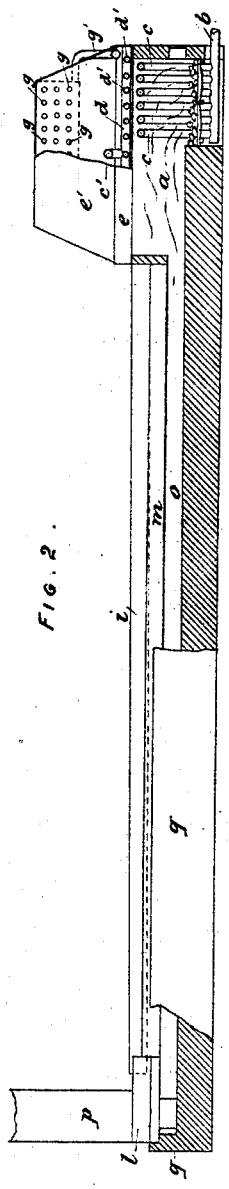
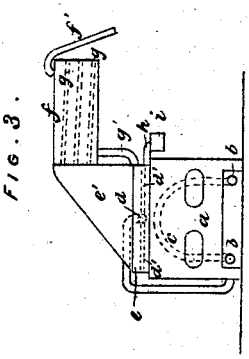
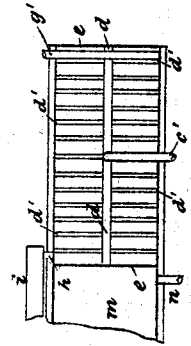
Witnesses
Inventor
R. G. Leckie by
H. W. Beadle, atty

UNITED STATES PATENT OFFICE.

ROBERT G. LECKIE, OF ACTON VALE, CANADA.

IMPROVEMENT IN EVAPORATORS FOR BRINE.

Specification forming part of Letters Patent No. 123,182, dated January 30, 1872.

SPECIFICATION.
*To all whom it may concern:*

Be it known that I, ROBERT GILMOUR LECKIE, of the Village of Acton Vale, in the county of Bagot, in the Province of Quebec, Canada, have invented new and useful "Improvements on Evaporators;" and I do hereby declare that the following is a full, clear, and exact description of the construction and operation of the same, reference being had to the annexed drawing, where—

Figure 1 represents a plan of the evaporator. Fig. 2 represents a part sectional and part elevational view of the evaporator. Fig. 3 represents an end elevation of evaporator. Fig. 4 represents a plan of evaporating-pan.

This invention has reference to improvements on evaporators, particularly those used for the manufacture of salt, for enabling them more effectually to utilize the heat, and for rendering more easy and certain the purification of the brine and the precipitation of the foreign substances contained therein.

In the drawing similar letters of reference indicate like parts.

Letter $a$ is a furnace of any ordinary construction, with either one or two fire-doors, as shown in Fig. 3, fire-bars, &c., &c., complete. Through the opening of the ash-pit, and running back underneath the grate, pass two pipes, $b\ b$, for the admission of atmospheric air, which is highly heated by passing thence through pipes $c\ c$, arched over the fire, as shown in Figs. 2 and 3. From this the heated air is conveyed by a pipe, $c'$, to a pipe, $d'$, running lengthwise of an evaporating-pan, $e$, any convenient number of pipes $d'$, perforated on the under side, branching out at right angles to $d$. This evaporating-pan $e$ is preferably of the configuration shown in the drawing, and being rendered steam-tight by a cover, $e'$, as shown. A tank, $f$, of any suitable size, is placed where indicated for the reception of the natural brine, which is pumped or otherwise led into it by a pipe, $f'$. The brine in this tank is slightly heated by the steam generated in the pan $e$, which passes through pipes $g$ led through the tank. The brine is then conveyed from the tank $f$ into the evaporating-pan $e$ by the pipe $g'$, which extends the whole breadth of the pan $e$, and is perforated on its lower side so as to feed the brine somewhat in the same way as would be done by a rose. From the lower end of the pan $e$ a pipe or conduit, $h$, leads to a trough, $i$, which communicates at its further end by pipes $k\ k'$, respectively, with a reservoir, $l$, and an evaporating-pan, $m$. The trough $i$ is divided into sections by diaphragms $i'$ of about three-fourths of the height of the sides of the trough. A discharge-pipe, $n$, is used to draw off the mother-liquor. The whole of the pipes mentioned may be furnished with stop-cocks to control and regulate the flow of brine. The flue $o$ from the furnace, passing under the pan $m$ and reservoir $l$ on its way to the chimney $p$, imparts to them the necessary heat, the bottom of the pan forming the top of the flue. The whole may be inclosed with brick-work, as shown at $q$, Fig. 2.

The manner of operating my invention is as follows: The natural brine is fed through the pipe $f'$ into the tank $f$, and is there partially warmed by the action of the steam generated in the evaporating-pan $e$, which, being prevented from escaping in any other way by the cover $e'$, passes through and heats the pipes $g$, the slight inclination in their position preventing any water that may arise from condensation from falling back into the pan $e$. The brine is then conducted for treatment to the evaporating-pan $e$, pouring into it through the perforations in the under side of the pipe $g'$, and is in this vessel brought to the point of saturation, the heated air supplied through the perforated pipes $d'$ keeping the brine in the bottom of the vessel in a constant state of ebullition, and preventing the deposit of any incrustation. From the pan $e$ the saturated brine passes by the pipe $h$ into the settling-trough $i$, where the sulphate of lime or other impurities held in mechanical suspension are deposited. The diaphragms $i'$, retarding the flow of the brine, assist in this operation. From the trough $i$ the brine may be either conveyed into the reservoir $l$, and thence into the evaporating-pan $m$, or directly into the pan $m$, in which the salt crystals are deposited; the supernatant liquor being drawn off when necessary, and the crystals are raked out in the usual way. The pans $m$ and $e$, forming the tops of the furnace and flue, may have a steam-space underneath, to which steam may be supplied from any suitable generator. In some cases the saturated brine, where not containing any large amount of impurities, may be run directly from the evaporating-pan $e$ into the pan $m$.

The drawing is made to a scale of sixteen feet to an inch.

Having thus described the construction and operation of my invention, to which I have given the name of "Leckie's Improved Evaporator and Salt-Pan," what I claim as my invention, and wish secured by Letters Patent, is as follows:

1. The combination of the tank $f$ and tubes $g$ with evaporating-pan $e$ and cover $e'$, arranged, constructed, and operating substantially as described.

2. The combination of the settling-trough $i$ with diaphragms $i'$, evaporating-pan $e$, reservoir $l$, and evaporating-pan $m$ and flue $o$, substantially as and for the purpose set forth.

3. The settling-trough $i$ with diaphragms $i'$, substantially as and for the purpose set forth.

4. The perforated pipe $g'$, in combination with evaporating-pan $e$, substantially as and for the purpose set forth.

Montreal, 8th day of December, A. D. 1871.

ROBERT GILMOUR LECKIE.

Witnesses:
CHARLES G. C. SIMPSON.
JAS. HY. REYNOLDS.